US012282283B2

(12) United States Patent
Ishii et al.

(10) Patent No.: US 12,282,283 B2
(45) **Date of Patent: *Apr. 22, 2025**

(54) CARTRIDGE INCLUDING PHOTOCONDUCTIVE DRUM, DEVELOPING ROLLER, MEMORY AND TERMINAL CONNECTED TO THE MEMORY

(71) Applicant: Brother Kogyo Kabushiki Kaisha, Nagoya (JP)

(72) Inventors: Masahiro Ishii, Nagoya (JP); Fumio Morita, Haguri-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,515

(22) Filed: Oct. 6, 2023

(65) Prior Publication Data

US 2024/0184239 A1 Jun. 6, 2024

Related U.S. Application Data

(60) Continuation of application No. 17/484,297, filed on Sep. 24, 2021, now Pat. No. 11,815,842, which is a (Continued)

(30) Foreign Application Priority Data

Feb. 20, 2007 (JP) ................................ 2007-040029
May 7, 2007 (JP) ................................ 2007-122706

(51) Int. Cl.

*G03G 15/00* (2006.01)
*G03G 15/08* (2006.01)
*G03G 21/16* (2006.01)

(52) U.S. Cl.

CPC ......... *G03G 15/80* (2013.01); *G03G 15/0865* (2013.01); *G03G 15/55* (2013.01); (Continued)

(58) Field of Classification Search

USPC ........................................................... 399/90
See application file for complete search history.

(56) References Cited

U.S. PATENT DOCUMENTS 5,521,693 A 5/1996 Kojima et al.
5,708,912 A 1/1998 Lee
(Continued)

FOREIGN PATENT DOCUMENTS

EP 1701224 A1 9/2006
JP 04-337758 A 11/1992
(Continued)

*Primary Examiner* — Quana Grainger
(74) *Attorney, Agent, or Firm* — Banner & Witcoff, Ltd.

(57) ABSTRACT

A developer cartridge according to one aspect is attachable to a photoconductor unit that comprises a photoconductive drum. The developer cartridge may comprise a main body having an opening, the main body comprising an electric circuit, a front cover configured to move to an opening position in which the opening of the main body is exposed and to a closing position in which the opening of the main body is closed, a first terminal electrically connected to the electric circuit, a photosensitive drum, and a developer cartridge comprising a developing roller, developing frame having a pressed portion, memory unit and second terminal. The front cover may include a pressing portion configured to press the pressed portion of the developing frame in a direction from the developing roller toward the photosensitive drum, and wherein the second terminal faces to the front cover when the front cover is in the closed position.

12 Claims, 6 Drawing Sheets

Related U.S. Application Data continuation of application No. 16/853,265, filed on Apr. 20, 2020, now Pat. No. 11,131,955, which is a continuation of application No. 16/582,707, filed on Sep. 25, 2019, now Pat. No. 10,649,390, which is a continuation of application No. 16/376,825, filed on Apr. 5, 2019, now Pat. No. 10,452,017, which is a continuation of application No. 15/429,405, filed on Feb. 10, 2017, now Pat. No. 10,281,867, which is a continuation of application No. 14/738,252, filed on Jun. 12, 2015, now Pat. No. 9,606,497, which is a continuation of application No. 14/047,734, filed on Oct. 7, 2013, now Pat. No. 9,058,013, which is a continuation of application No. 13/540,885, filed on Jul. 3, 2012, now Pat. No. 8,559,843, which is a division of application No. 13/182,141, filed on Jul. 13, 2011, now Pat. No. 8,233,816, which is a division of application No. 12/034,203, filed on Feb. 20, 2008, now Pat. No. 8,005,392.

(52) U.S. Cl.
CPC ... *G03G 21/1652* (2013.01); *G03G 2221/163* (2013.01); *G03G 2221/1823* (2013.01)

(56) References Cited

U.S. PATENT DOCUMENTS

| | | | |
|---|---|---|---|
| 5,950,049 | A | 9/1999 | Yokomori et al. |
| 6,041,203 | A | 3/2000 | Suzuki et al. |
| 6,101,350 | A | 8/2000 | Suzuki et al. |
| 6,404,995 | B1 | 6/2002 | Kimizuka |
| 7,082,276 | B2 | 7/2006 | Karakama et al. |
| 7,177,551 | B2 | 2/2007 | Eom et al. |
| 7,953,339 | B2 | 5/2011 | Fukamachi et al. |
| 7,986,898 | B2 | 7/2011 | Hashimoto |
| 8,213,829 | B2 | 7/2012 | Choi et al. |
| 10,429,795 | B2 | 10/2019 | Saeki et al. |
| 2003/0215261 | A1 | 11/2003 | Karakama et al. |
| 2005/0019061 | A1 | 1/2005 | Karakama et al. |
| 2006/0024080 | A1 | 2/2006 | Chadani et al. |
| 2007/0009281 | A1 | 1/2007 | Sato et al. |
| 2007/0166070 | A1 | 7/2007 | Sato |
| 2008/0026338 | A1 | 1/2008 | Cinader |
| 2008/0240774 | A1* | 10/2008 | Fukamachi ........ G03G 15/0865 399/111 |
| 2008/0317499 | A1 | 12/2008 | Nishimura |
| 2009/0214249 | A1 | 8/2009 | Lee et al. |

FOREIGN PATENT DOCUMENTS

| | | | |
|---|---|---|---|
| JP | 08-211818 | A | 8/1996 |
| JP | 11-184195 | A | 7/1999 |
| JP | 2000-250310 | A | 9/2000 |
| JP | 2000-250378 | A | 9/2000 |
| JP | 2001125462 | A | 5/2001 |

* cited by examiner

CARTRIDGE INCLUDING PHOTOCONDUCTIVE DRUM, DEVELOPING ROLLER, MEMORY AND TERMINAL CONNECTED TO THE MEMORY

REFERENCE TO RELATED APPLICATIONS

This application is a continuation of U.S. Ser. No. 17/484,297, filed Sep. 24, 2021, which is a continuation of U.S. Ser. No. 16/853,265, filed Apr. 20, 2020, (now U.S. Pat. No. 11,131,955), which is a continuation of U.S. Ser. No. 16/582,707, filed Sep. 25, 2019, (now U.S. Pat. No. 10,649,390), which is a continuation of U.S. Ser. No. 16/376,825, filed Apr. 5, 2019, (now U.S. Pat. No. 10,452,017), which is a continuation of U.S. Ser. No. 15/429,405, filed Feb. 10, 2017, (now U.S. Pat. No. 10,281,867), which is a continuation of U.S. Ser. No. 14/738,252, filed Jun. 12, 2015, (now U.S. Pat. No. 9,606,497), which is a continuation of U.S. Ser. No. 14/047,734, (now U.S. Pat. No. 9,058,013), filed Oct. 7, 2013, which is a continuation of U.S. Ser. No. 13/540,885, (now U.S. Pat. No. 8,559,843), filed Jul. 3, 2012, which is a divisional of U.S. Ser. No. 13/182,141 (now U.S. Pat. No. 8,233,816), filed Jul. 13, 2011, which was a divisional of U.S. Ser. No. 12/034,203 (now U.S. Pat. No. 8,005,392), filed Feb. 20, 2008, which is based upon and claims the benefit of priority from Japanese Patent Application No. 2007-040029, filed on Feb. 20, 2007, and Japanese Patent Application No. 2007-122706, filed on May 7, 2007, the entire contents of which are incorporated herein by reference.

BACKGROUND ART

Technical Field

The present invention relates to an image forming device, a process cartridge, and a developer cartridge.

Background

In general, in image forming devices such as laser printers and digital copiers, a laser beam is applied to a photoconductive member to correspond to data of an image to be printed, thereby forming an electrostatic latent image on the photoconductive member.

In order to facilitate maintenance of the devices and reduce the maintenance cost, both or one of a photoconductive drum and a developing roller can be embodied as a replaceable cartridge to the image forming device. For example, a developer cartridge having a developing roller is attached to the image forming device, or a developer cartridge is attached to a photoconductor cartridge having a photoconductive drum to form a process cartridge and then the process cartridge is attached to the image forming device.

At the time of forming an image by supplying a toner to an electrostatic latent image, it is necessary that the developing roller comes in uniform and precise contact with the photoconductive drum in the axis direction. However, in the structure that the photoconductor cartridge, the developer cartridge, or the process cartridge can be replaced, the distribution of the contact force in the axis direction may not be uniform. Therefore, there is provided that a developing-roller pressing mechanism for pressing the developing roller to the photoconductive member precisely and uniformly in the axis direction even after replacing the cartridges is disposed at one position or plural positions of the image forming device or the cartridges. Such a mechanism is disclosed, for example, JP-A-2000-250378.

The process cartridge or the developer cartridge thereof may include a memory unit that stores information such as an amount of toner and characteristics of members useful for easily and punctually performing the replacement or maintenance of the cartridges. Such a memory unit is disclosed, for example, JP-A-8-211818. In response to a request for performance or a decrease in cost, a contact IC chip may be employed as the memory unit. In this way, when the memory unit electrically connected to the main body is provided, it is necessary to make a stable contact between a terminal of the memory unit and a terminal of the image forming device to allow the memory unit to normally work.

However, when an electrical contact of the memory unit is disposed independent of the developing-roller pressing mechanism of JP-A-2000-250378, the pressing force of the developing roller may not be balanced and thus the developing roller may not be pressed to the photoconductive member uniformly in the axis direction.

DESCRIPTION

Summary

One aspect of the invention has an object to provide an image forming device, a process cartridge, and a developer cartridge, which can electrically connect a memory unit to a main body while keeping a pressing force of a developing roller to a photoconductive drum uniform in the axis direction.

According to a first aspect of the invention, there is provided an image forming device comprising: a main body; a photoconductive drum; a developer cartridge comprising: a developing roller pressed to the photoconductive drum and extending in an axis direction; and a developing frame supporting the developing roller, wherein the developer cartridge comprises: a memory unit attached to the developing frame; and a first terminal exposed externally on the developing frame and electrically connected to the memory unit, and wherein the main body comprises: an electric circuit; pressing members respectively disposed at a plurality of positions with respect to the axis direction and configured to abut the developing frame to press the developing roller to the photoconductive drum uniformly in the axis direction; and a second terminal electrically connected to the electric circuit and disposed at at least one of the pressing members to contact with the first terminal.

According to a second aspect of the invention, there is provided a process cartridge comprising: a photoconductor cartridge comprising a photoconductive drum supported by a photoconductor frame; and a developer cartridge detachably attached to the photoconductor cartridge and comprising a developing roller extending in an axis direction, wherein the developer cartridge comprises: a developing frame that supports the developing roller; a memory unit attached to the developing frame; and a first terminal exposed on an outer portion of the developing frame and electrically connected to the memory unit, and wherein the photoconductor cartridge comprises: pressing members respectively disposed at a plurality of positions with respect to the axis direction and configured to press the developing roller to the photoconductive drum uniformly in the axis direction; a second terminal disposed at at least one of the pressing members to contact with the first terminal and presses the developer cartridge toward the photoconductive drum; and a third terminal electrically connected to the second terminal and disposed at an outer portion of the photoconductor frame to allow an electric contact with an external electrical contact.

According to a third aspect of the invention, there is provided a process cartridge comprising: a photoconductor cartridge comprising a photoconductive drum supported by a photoconductor frame; and a developer cartridge detachably attached to the photoconductor cartridge and comprising a developing roller extending in an axis direction, wherein the developer cartridge comprises: a developing frame; a memory unit attached to the developing frame; pressing members respectively disposed at a plurality of positions with respect to the axis direction to press the developing roller to the photoconductive drum uniformly in the axis direction; and a first terminal electrically connected to the memory unit and disposed at at least one of the pressing members, and wherein the photoconductor cartridge comprises: second terminals respectively disposed at a plurality of positions in the axis direction to press the developer cartridge to the photoconductive drum, at least one of the second terminals being abutted on by the first terminal; and a third terminal electrically connected to the second terminal and disposed at an outer portion of the photoconductor frame to allow an electric contact with an external electrical contact.

According to a fourth aspect of the invention, there is provided a developer cartridge attachable to a photoconductor unit that comprises a photoconductive drum, said developer cartridge comprising: a developing frame; a developing roller rotatably supported by the developing frame, and pressed to the photoconductive drum in a pressing direction when the developer cartridge is attached to the photoconductor cartridge; a memory unit attached to the developing frame; and a terminal electrically connected to the memory unit and disposed at an outer portion of the developing frame at a position substantially opposite to the developing roller with respect to the pressing direction.

According to a fifth aspect of the invention, there is provided a developer cartridge attachable to a photoconductive unit, the photoconductor unit comprises: a photoconductive drum supported by a photoconductor frame; pressing members; a second terminal disposed at at least one of the pressing members; and a third terminal electrically connected to the second terminal and disposed at an outer portion of the photoconductor frame to allow an electric contact with an external electrical contact, said developer cartridge comprising: a developing roller extending in an axis direction; a developing frame that supports the developing roller; a memory unit attached to the developing frame; and a first terminal exposed on an outer portion of the developing frame and electrically connected to the memory unit, wherein, when the developer cartridge is attached to the photoconductor unit, the developing frame receives a force from the pressing members of the photoconductor unit to press the developing roller to the photoconductive drum uniformly in the axis direction, and wherein the first terminal is disposed at a position to contact with the second terminal when the developer cartridge is attached to the photoconductor unit.

According to a sixth aspect of the invention, there is provided a developer cartridge attachable to a photoconductive unit, the photoconductor unit comprises: a photoconductive drum supported by a photoconductor frame; a second terminal; and a third terminal electrically connected to the second terminals and disposed at an outer portion of the photoconductor frame to allow an electric contact with an external electrical contact, said developer cartridge comprising: a developing roller extending in an axis direction; a developing frame that supports the developing roller; a memory unit attached to the developing frame; pressing members respectively disposed at the developing frame at a plurality of positions with respect to the axis direction; and a first terminal disposed at at least one of the pressing members electrically connected to the memory unit, wherein, when the developer cartridge is attached to the photoconductor unit, the pressing members urges the second terminals so that the second terminals apply a force to press the developing roller to the photoconductive drum uniformly in the axis direction, and wherein, when the developer cartridge is attached to the photoconductor unit, the first terminal contacts with the second terminal.

DETAILED DESCRIPTION

First Embodiment

<Entire Configuration of Image Forming Device>

Figure 1:
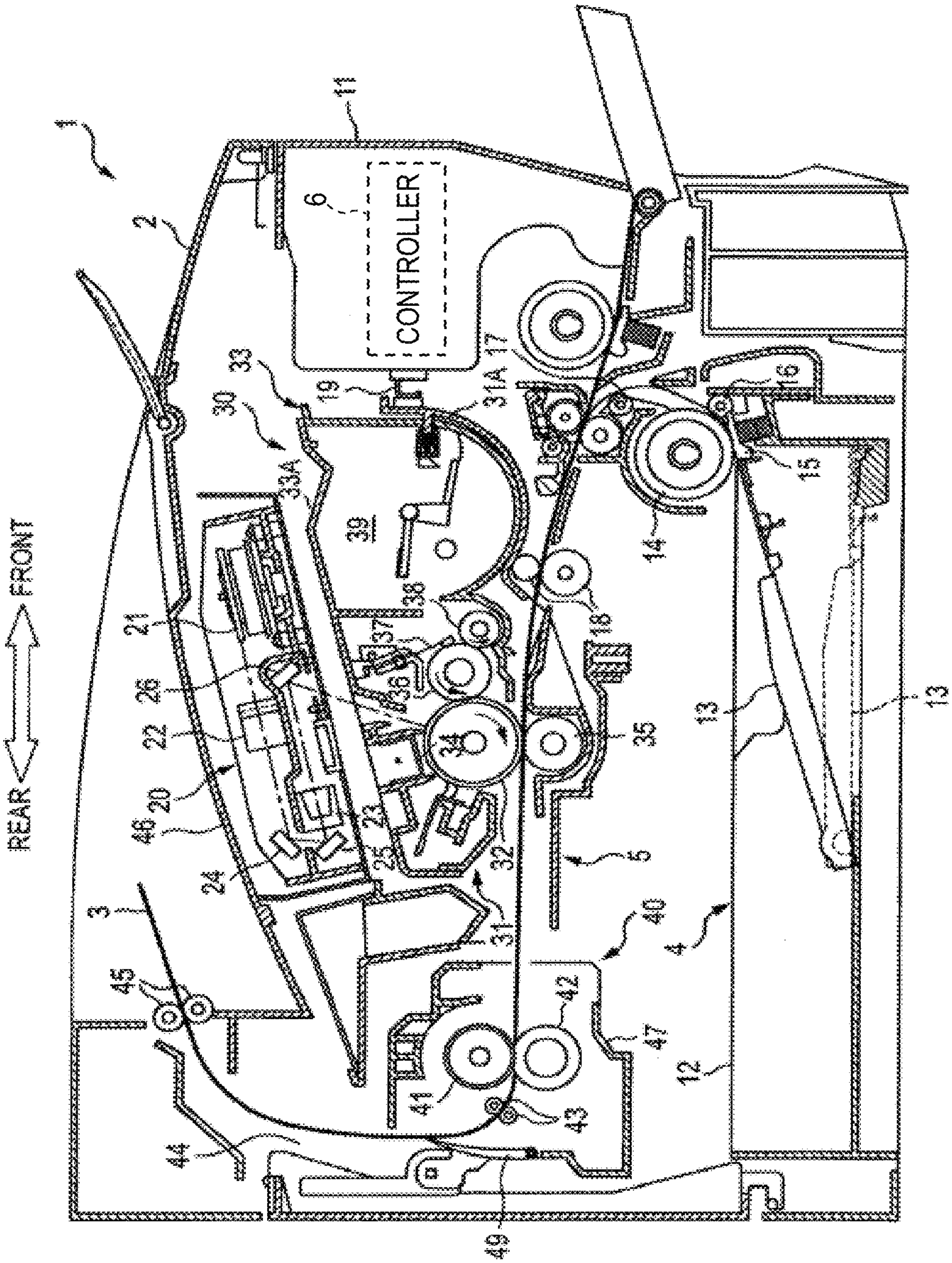
FIG. 1 is a side cross-sectional view illustrating an image forming device according to a first embodiment of the invention.
Figure 2:
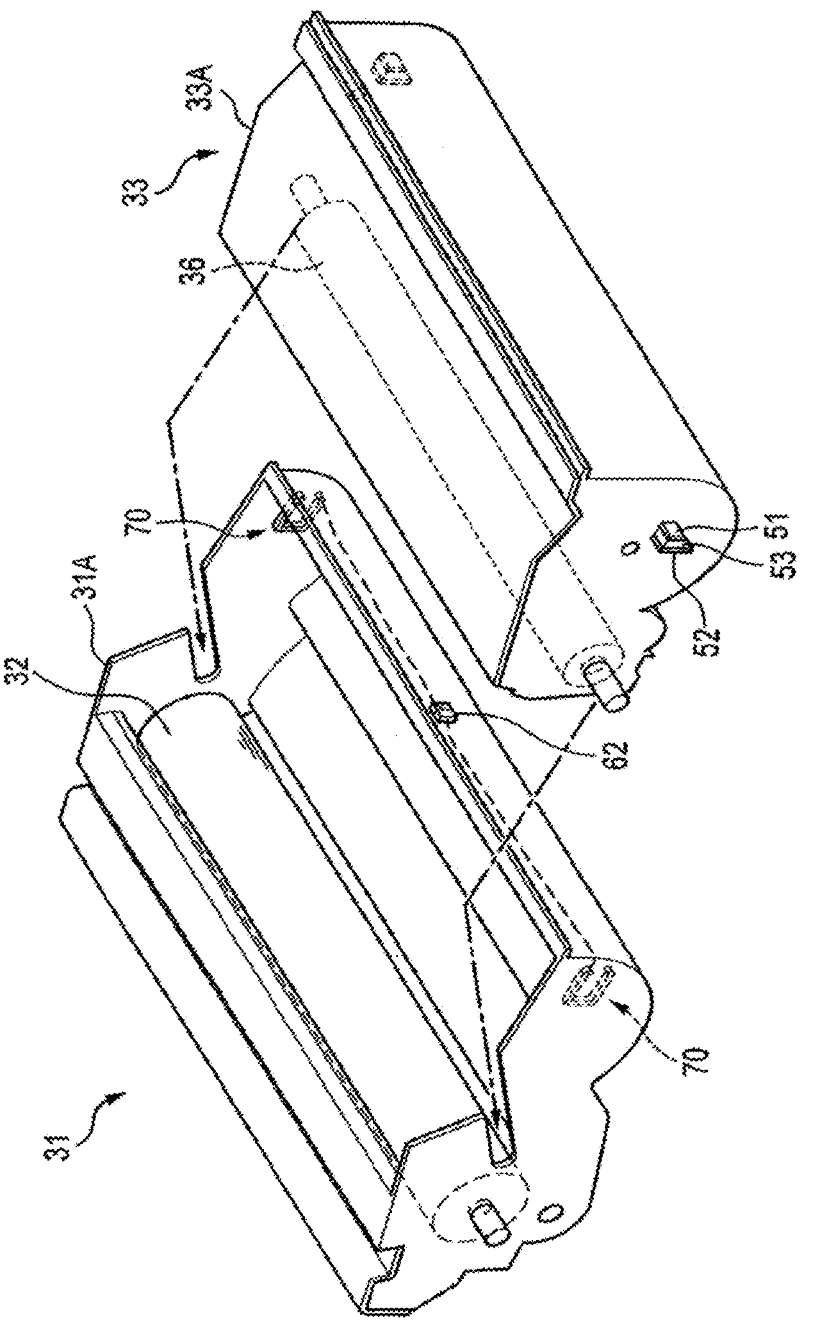
FIG. 2 is a perspective view illustrating a photoconductor cartridge and a developer cartridge as viewed from the front side.

Hereinafter, an embodiment of the invention will be described in detail with reference to the attached drawings. In the drawings, FIG. 1 is a side cross-sectional view illustrating an image forming device and FIG. 2 is a perspective view illustrating a photoconductor cartridge and a developer cartridge. In the following description, the right side in FIG. 1 is defined as a front and the left side is defined as a rear. Also, regarding directions of a process cartridge 30, a photoconductor cartridge 31, and a developer cartridge 33 (which will be described later), the following description refers to directions in a state where they are attached to an image forming device (see FIG. 1).

As shown in FIG. 1, an image forming device 1 includes a feeder unit 4 that feeds a sheet 3 into a main casing 2 (main body) and an image forming unit 5 that forms an image on the fed sheet 3.

A front cover 11 (opening and closing member) that can be freely opened and closed is disposed at a front portion of the main casing 2. A process cartridge 30 to be described later is detachably attached through an opening formed when the front cover 11 is opened.

<Configuration of Feeder Unit>

The feeder unit 4 includes a sheet feeding tray 12 that is detachably attached to the bottom of the main casing 2 and a sheet pressing plate 13 disposed in the sheet feeding tray 12. The feeder unit 4 further includes a feed roller 14 disposed above an end of the sheet feeding tray 12, a feed pad 15, and sheet-powder removing rollers 16 and 17 disposed more downstream in a direction in which the sheet 3 is conveyed than the feed roller 14. The feeder unit 4 includes a registration roller 18 disposed more downstream than the sheet-powder removing rollers 16 and 17.

In the feeder unit 4 having the above-mentioned configuration, the sheet 3 in the sheet feeding tray 12 is made to move to the feed roller 14 by the sheet pressing plate 13. The sheet 3 is sent from the feed roller 14 and the feed pad 15, and then passes through the sheet-powder removing rollers 16, 17 and the registration roller 18. Accordingly, the sheet 3 is conveyed to the image forming unit 5 sheet by sheet.

<Configuration of Image Forming Unit>

The image forming unit 5 includes a scanner unit 20, a process cartridge 30, and a fixing unit 40.

<Configuration of Scanner Unit>

The scanner unit 20 is disposed in an upper portion in the main casing 2 and includes a laser emitting portion (not shown), a polygon mirror 21 that is rotationally driven, lenses 22 and 23, and reflecting mirrors 24, 25, and 26. As indicated by a dotted line, a laser beam based on image data and emitted from the laser emitting portion is subjected to reflection or transmission in the order of the polygon mirror 21, the lens 22, the reflecting mirrors 24 and 25, the lens 23, and the reflecting mirror 26 and is applied to the surface of a photoconductive drum 32 of the process cartridge 30 at a high speed.

<Configuration of Process Cartridge>

The process cartridge 30 is disposed below the scanner unit 20 and is detachably attached to the main casing 2. The process cartridge 30 includes a photoconductor cartridge 31 and a developer cartridge 33 as an example of the cartridge.

<Configuration of Developer Cartridge>

The developer cartridge 33 is detachably attached to a hollow photoconductor frame 31A constituting the outer frame of the photoconductor cartridge 31 (see FIG. 2) and includes a developing roller 36, a thickness regulating blade 37, a supply roller 38, and a toner hopper 39 as an example of the developer container. The developing roller 36 is rotatably supported by a hollow developing frame 33A (cartridge frame) constituting the outer frame of the developer cartridge 33.

A toner (not shown) as an example of the developer contained in the toner hopper 39 is supplied to the developing roller 36 with the rotation in the arrow direction (in the counterclockwise direction) of the supply roller 38. At this time, the toner is frictionally charged positive between the supply roller 38 and the developing roller 36. The toner supplied to the developing roller 36 enters between the thickness regulating blade 37 and the developing roller 36 with the rotation in the arrow direction (in the counterclockwise direction) of the developing roller 36 and is held as a thin layer having a constant thickness on the developing roller 36.

<Configuration of Photoconductor Cartridge>

The photoconductor cartridge 31 includes a photoconductive drum 32, a scorotron charging unit 34, and a transfer roller 35. The photoconductive drum 32 is supported by the photoconductor frame 31A so as to be rotatable in the arrow direction (in the clockwise direction). The drum body of the photoconductive drum 32 is grounded and the surface thereof is formed of a positively-charging photoconductive layer made of polycarbonate.

The scorotron charging unit 34 is disposed above the photoconductive drum 32 with a predetermined gap therebetween so as not to contact with the photoconductive drum 32. The scorotron charting unit 34 is a positively-charging scorotron charger that generates a corona discharged from a charging wire made of tungsten or the like and uniformly charges the surface of the photoconductive drum 32 in a positive polarity.

The transfer roller 35 is disposed below the photoconductive drum 32 so as to contact with the photoconductive drum 32 and is supported by the photoconductor frame 31A so as to be rotatable in the arrow direction (in the counterclockwise direction). In the transfer roller 35, a metal roller shaft is coated with a conductive rubber material. A transfer bias is applied to the transfer roller 35 by static current control at the time of transfer.

In the photoconductor cartridge 31 having the above-mentioned configuration, the surface of the photoconductive drum 32 is positively charged by the scorotron charging unit 34 and then is exposed by means of high-speed scanning of a laser beam from the scanner unit 20. Accordingly, the potential of the exposed portion is lowered to form an electrostatic latent image based on image data.

Here, the "electrostatic latent image" means the exposed portion of which the potential is lowered by means of the exposure to the laser beam, on the surface of the photoconductive drum 32 uniformly charged in a positive polarity.

Next, when the toner held on the developing roller 36 comes in contact with the photoconductive drum 32 with the rotation of the developing roller 36, the toner is supplied to the electrostatic latent image formed on the surface of the photoconductive drum 32. In this way, the toner is selectively held on the surface of the photoconductive drum 32 and is thus visualized, thereby forming a toner image by means of a reversal development.

Thereafter, the photoconductive drum 32 and the transfer roller 35 are rotationally driven to convey the sheet 3. By conveying the sheet 3 between the photoconductive drum 32 and the transfer roller 35, a toner image held on the surface of the photoconductive drum 32 is transferred to the sheet 3.

<Configuration of Fixing Unit>

The fixing unit 40 is disposed on the downstream side of the process cartridge 30 and includes a heating roller 41, a pressing roller 42 that is disposed to be opposite the heating roller 41 so as to press the heating roller 41, and a pair of conveying roller 43 disposed more downstream than the heating roller 41 and the pressing roller 42.

In the fixing unit 40 having the above-mentioned configuration, the toner transferred to the sheet 3 is thermally fixed while the sheet 3 passes between the heating roller 41 and the pressing roller 42 and thereafter, the sheet 3 is conveyed to a sheet discharging path 44 by the conveying rollers 43 and a flapper 49. The sheet 3 sent to the sheet discharging path 44 is discharged to a sheet discharging tray 46 by the discharge roller 45. A part of the rear portion of the main casing 2 is formed of a cover that is opened and closed to expose or cover the fixing unit 40.

<Configuration of Pressing Member>

Figure 3:
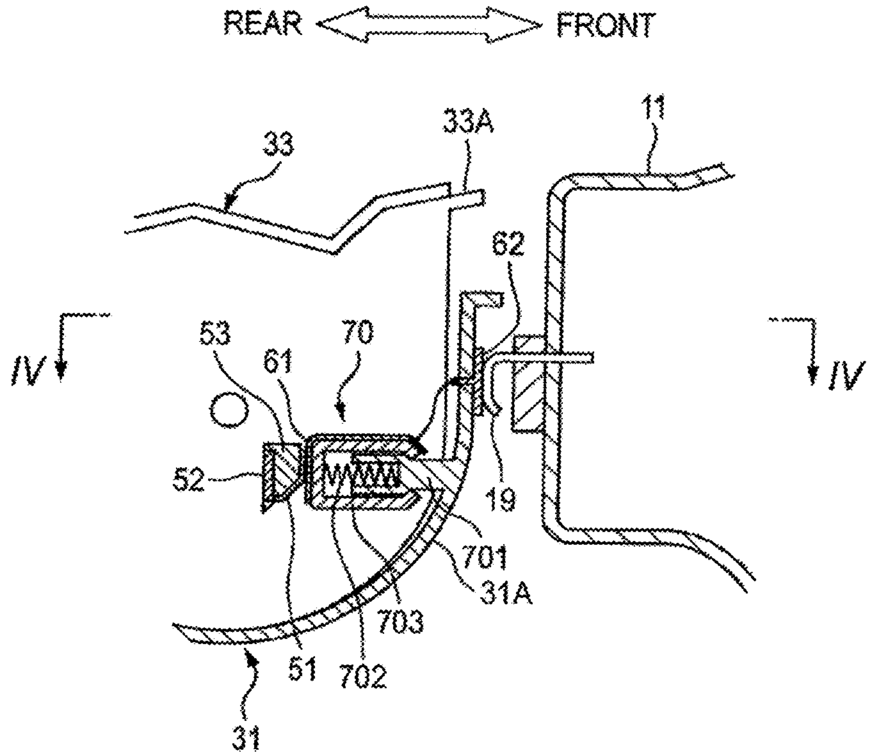
FIG. 3 is a side cross-sectional view illustrating a front portion of a process cartridge and a rear portion of a front cover in a state where the process cartridge is attached to a main casing and the front cover is closed.
Figure 4:
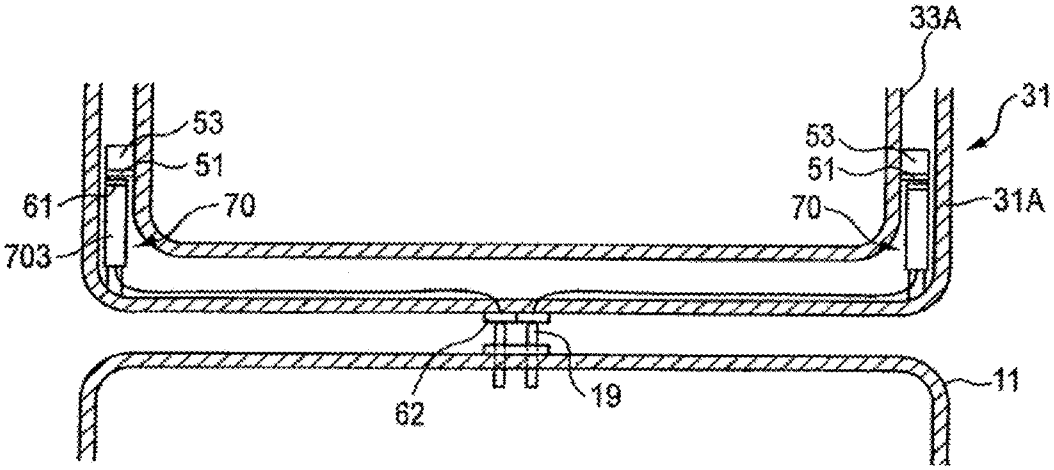
FIG. 4 is a cross-sectional view taken along Line IV-IV of FIG. 3, which shows a state where a developing-frame terminal is connected to a main-body terminal.

FIG. 3 is a side cross-sectional view illustrating a front portion of a process cartridge and a rear portion of a front cover in a state where the process cartridge is attached to a main casing and the front cover 11 is closed. FIG. 4 is a cross-sectional view taken along Line IV-IV of FIG. 3, which illustrates a state where a developing-frame terminal comes in contact with a main-body terminal.

As shown in FIGS. 3 and 4, pressing members 70 are disposed at plural positions of the photoconductor frame 31A in an axis direction of the developing roller 36, that is, at two positions in the vicinity of the inside of both side walls of the photoconductor frame 31A. The pressing members 70 are symmetrically disposed with respect to a plane passing through the center position in the axis direction of the developing roller 36 and perpendicular to the axis direction. Accordingly, as described later, the developer cartridge 33 is pressed to the photoconductive drum 32 with a force distributed uniformly in the axis direction.

Each pressing member 70 includes a pressing-member supporting portion 701 protruding from the photoconductor frame 31A, a spring 702, and a spring cover 703. The pressing-member supporting portion 701 is formed in a concave shape that extends from the front to the rear and the end is divided into two branches and is spread slightly upward. The spring 702 is attached to the bottom of the concave shape. The spring cover 703 surrounds the end of the pressing-member supporting portion 701 to which the spring 702 is attached and engages with the pressing-member supporting portion 701 so as to be slidable in the anteroposterior direction. A compression coil spring is employed as the spring 702.

<Main-Body Terminal>

As shown in FIG. 3, the inner surface of the front cover 11, that is, the surface opposed to the process cartridge 30, is provided with a main-body terminal 19. The main-body terminal 19 is connected to a controller 6 (an electric circuit) and disposed in the main body.

<Inner Terminal and Outer Terminal>

The end of each of the spring covers 703 is formed flat and an inner terminal 61 is disposed on the rear surface thereof. An outer terminal 62 is disposed on the front surface of the photoconductor frame 31A, that is, on the outer surface on a side of the front cover 11.

The inner terminals 61 and the outer terminal 62 are electrically connected to each other through a contact of a metal plate or a wire. In the example shown in FIG. 3, the outer terminal 62 is exposed partially from the hole formed in the front wall of the photoconductor frame 31A to the inside of the photoconductor frame 31A and the exposed portion is connected to the inner terminals 61 through wires.

The outer terminal 62 is disposed to come in contact with the main-body terminal 19. In the example shown in FIG. 4, the main-body terminal 19 comes in contact with the outer terminal 62, in a state where the process cartridge 30 is attached to the main casing 2 and the front cover 11 is closed.

<Developing-Frame Terminal>

As shown in FIG. 3, memory units 52 and developing-frame terminals 51 are disposed on the outer surface of the developing frame 33A. The number of memory units 52 may be arbitrary.

The developing-frame terminals 51 are respectively electrically connected to the memory units 52 through the contacts of metal plates or wires. In the example shown in FIG. 3, the memory units 52 are respectively disposed on the rear surfaces of prism-shaped protrusions 53. Each of the prism-shaped protrusions 53 protrudes externally from the side surface of the developing frame 33A. The developing-frame terminals 51 are respectively disposed on the front surfaces of the prism-shaped protrusions 53. The developing-frame terminals 51 are drawn into the lower sides of the protrusions 53 and are electrically connected to the memory units 52, respectively.

Each of the protrusion 53 has an inclined surface of which the lower side goes up toward the front. When the developer cartridge 33 is pushed into the photoconductor frame 31A from the upside, the inclined surfaces enter the lower sides while contracting the pressing members 70.

Each of the developing-frame terminals 51 is disposed at a position opposed to the inner terminal 61 in a state where the developer cartridge 33 is attached to the photoconductor frame 31A. More specifically, each of the developing-frame terminals 51 is disposed to come in contact with the respective one of inner terminals 61 at a position which is closer to the photoconductive drum 32 than the position of the respective one of inner terminals 61 when the respective one of springs 702 is the shortest and more distant from the photoconductive drum 32 than the position of the respective one of inner terminals 61 when the respective one of springs 702 is not pressed.

Operations of the photoconductor cartridge 31, the developer cartridge 33, and the image forming device 1 will be described.

The developer cartridge 33 shown in FIG. 2 is attached to the photoconductor frame 31A to constitute the process cartridge 30.

When the developer cartridge 33 is attached to the photoconductor frame 31A, the springs 702 of the pressing members 70 disposed at plural positions inside the photoconductor frame 31A are pressed to the protrusions 53 disposed at plural positions outside the developing frame 33A and are contracted.

As shown in FIG. 3, when the developer cartridge 33 is completely attached to the photoconductor frame 31A, the expanding pressure of the springs 702 of the pressing members 70 is always applied to the protrusions 53 and thus the pressing force toward the photoconductive drum 32 is applied to the developing frame 33A (pressing operation). By means of the pressing operation, the developing roller 36 supported by the developing frame 33A is pressed to and comes in contact with the photoconductive drum 32 (pressed state). Since the pressing members 70 are disposed symmetrically at two positions of the photoconductor frame 31A in the axis direction of the developing roller 36, the developing roller 36 is pressed to the photoconductive drum 32 uniformly in the axis direction.

By means of the pressing operation, the developing roller 36 is pressed to the photoconductive drum 32 and the developing-frame terminals 51 disposed at the protrusions 53 come in contact with the inner terminals 61 disposed on the surfaces of the spring covers 703 of the pressing members 70.

When the front cover 11 is opened and the process cartridge 30 is attached to the main casing 2 through the opening and thereafter the front cover 11 is closed, as shown in FIGS. 3 and 4, the main-body terminal 19 disposed at the front cover 11 comes in contact with the outer terminal 62 disposed at the outer front portion of the photoconductor frame 31A.

In the pressed state, the memory units 52 are connected to the controller 6 of the main body through the developing-frame terminals 51, the inner terminals 61, the outer terminal 62, and the main-body terminal 19.

In the image forming device 1 according to this embodiment, since the inner terminals 61 are respectively disposed at the pressing members 70, a simple configuration is obtained. The inner terminals 61 disposed at the pressing members 70 respectively come in contact with the developing-frame terminals 51 and the pressing members 70 press the developing frame 33A to the photoconductive drum 32, thereby matching a pressing position for pressing the developing roller 36 to the photoconductive drum 32 with an electrical connection position for the memory units 52.

Since the contact pressure when the main-body terminal 19 comes in contact with the outer terminal 62 is relatively small and acts on the entire process cartridge, it does not prevent the pressing members 70 from uniformly pressing the developing roller 36 to the photoconductive drum 32.

Second Embodiment

The basic configuration of an image forming device according to a second embodiment of the invention is the same as the first embodiment and thus only different points are described.

Figure 5:
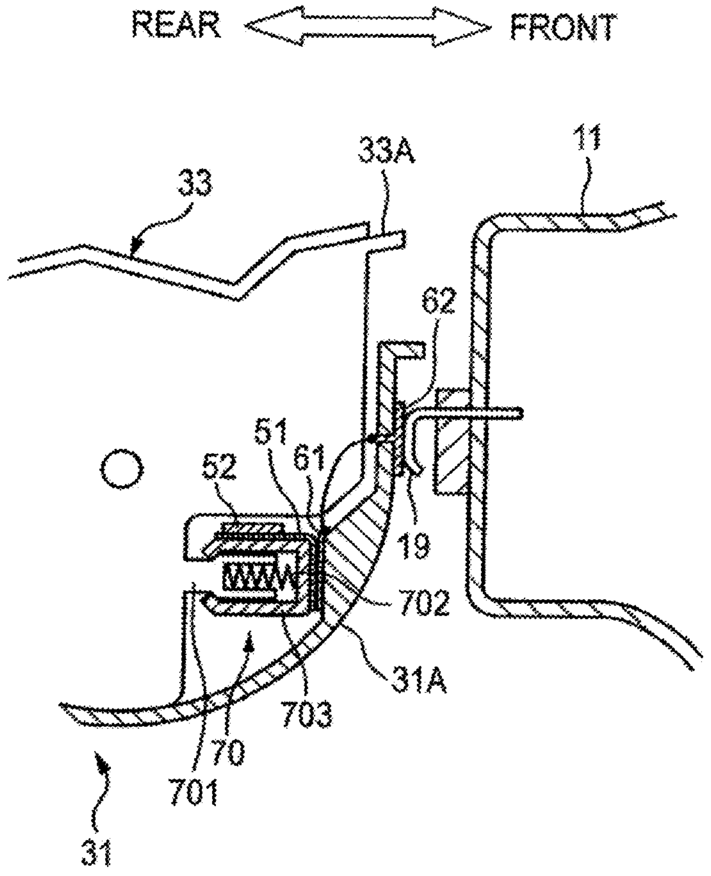
FIG. 5 is a side cross-sectional view illustrating the front portion of the process cartridge and the rear portion of the front cover in a state where the process cartridge is attached to the main casing and the front cover is closed according to a second embodiment.

FIG. 5 is a side cross-sectional view illustrating a front portion of a process cartridge and a rear portion of a front cover in a state where the process cartridge is attached to the main casing and the front cover is closed.

<Arrangement of Pressing Members>

As shown in FIG. 5, each pressing member 70 includes a pressing-member supporting portion 701, a spring 702, and a spring cover 703, similarly to the first embodiment.

The pressing members 70 are disposed symmetrically at two positions outside both side walls of the developing frame 33A (only one position is shown).

<Developing-Frame Terminal>

The end of the spring cover 703 of each pressing member 70 is formed flat, and each of developing-frame terminals 51 is disposed on the outer (front) surface thereof. Each of the memory units 52 is disposed at the pressing member 70 as a part of the developing frame 33A. The memory units 52 are electrically connected to the developing-frame terminal 51.

<Inner Terminal and Outer Terminal>

As shown in FIG. 5, the inner terminals 61 are disposed on the inner surface of the front wall of the photoconductor frame 31A so as to respectively come in contact with the developing-frame terminals 51 in a state where the developer cartridge 33 is attached to the photoconductor frame 31A.

The outer terminal 62 is disposed on the outer surface of the photoconductor frame 31A and the inner terminals 61 and the outer terminal 62 are electrically connected to each other through the contact of a metal plate or a wire. In the example shown in FIG. 5, the outer terminal 62 is exposed partially from the hole formed in the photoconductor frame 31A to the inside of the photoconductor frame 31A and the exposed portion of the outer terminal 62 is connected to the inner terminals 61 through wires.

The outer terminal 62 is disposed to come in contact with the main-body terminal 19. In the example shown in FIG. 5, the main-body terminal 19 comes in contact with the outer terminal 62, in a state where the photoconductor cartridge 31 is attached to the main casing 2 and the front cover 11 is closed.

The main-body terminal 71 serves as an external electric contact of the outer terminal 62.

The developing-frame terminals 51 are disposed at a position where the developer cartridge 33 can be pressed to the photoconductive drum 32 with the expanding pressure of the springs 702 of the pressing members 70 while coming in contact with the inner terminals 61, in a state where the developer cartridge 33 is attached to the photoconductor frame 31A. That is, each of the developing-frame terminals 51 is disposed to come in contact with the respective one of inner terminals 61 at a position which is more distant from the photoconductive drum 32 than the position of the respective one of inner terminals 61 when the respective one of springs 702 is the shortest and closer to the photoconductive drum 32 than the position of the respective one of inner terminals 61 when the respective one of springs 702 is not pressed.

The operations of the photoconductor cartridge 31, the developer cartridge 33, and the image forming device 1 are basically equal to those of the first embodiment, except that the pressing members 70 are disposed at the developing frame 33A and the directions of the pressing members 70 are inverted.

When the developer cartridge 33 is attached to the photoconductor frame 31A, the springs 702 of the pressing members 70 disposed at the plural positions outside the developing frame 33A are pressed to the inner terminals 61 disposed at plural positions inside the photoconductor frame 31A and are contracted.

As shown in FIG. 5, when the developer cartridge 33 is completely attached to the photoconductor frame 31A, the expanding pressure of the springs 702 of the pressing members 70 is always applied to the inner terminals 61. The expanding pressure acts in a direction in which the developing frame 33A is pressed to the photoconductive drum 32 (pressing operation). By means of the pressing operation, the developing roller 36 supported by the developing frame 33A is pressed to the photoconductive drum 32 and comes in contact therewith (pressed state). Since the pressing members 70 are disposed symmetrically at the plural positions of the developing frame 33A in the axis direction of the developing roller 36, the developing roller 36 is pressed to the photoconductive drum 32 uniformly in the axis direction.

In the image forming device 1 according to this embodiment, since the developing-frame terminals 51 are disposed at the pressing members 70, a simple and compact configuration is obtained. Since the developing-frame terminals 51 disposed at the pressing members 70 come in contact with the inner terminals 61 and presses the developing frame 33A to the photoconductive drum 32, it is possible to match the pressing positions with the electrical connection positions. Since the contact pressure when the main-body terminal 19 comes in contact with the outer terminal 62 is relatively small and acts on the entire process cartridge, it does not prevent the pressing members 70 from uniformly pressing the developing roller 36 to the photoconductive drum 32.

Third Embodiment

The basic configurations of an image forming device according to a third embodiment of the invention are the same as the first embodiment and thus only different points are described below.

Figure 6:
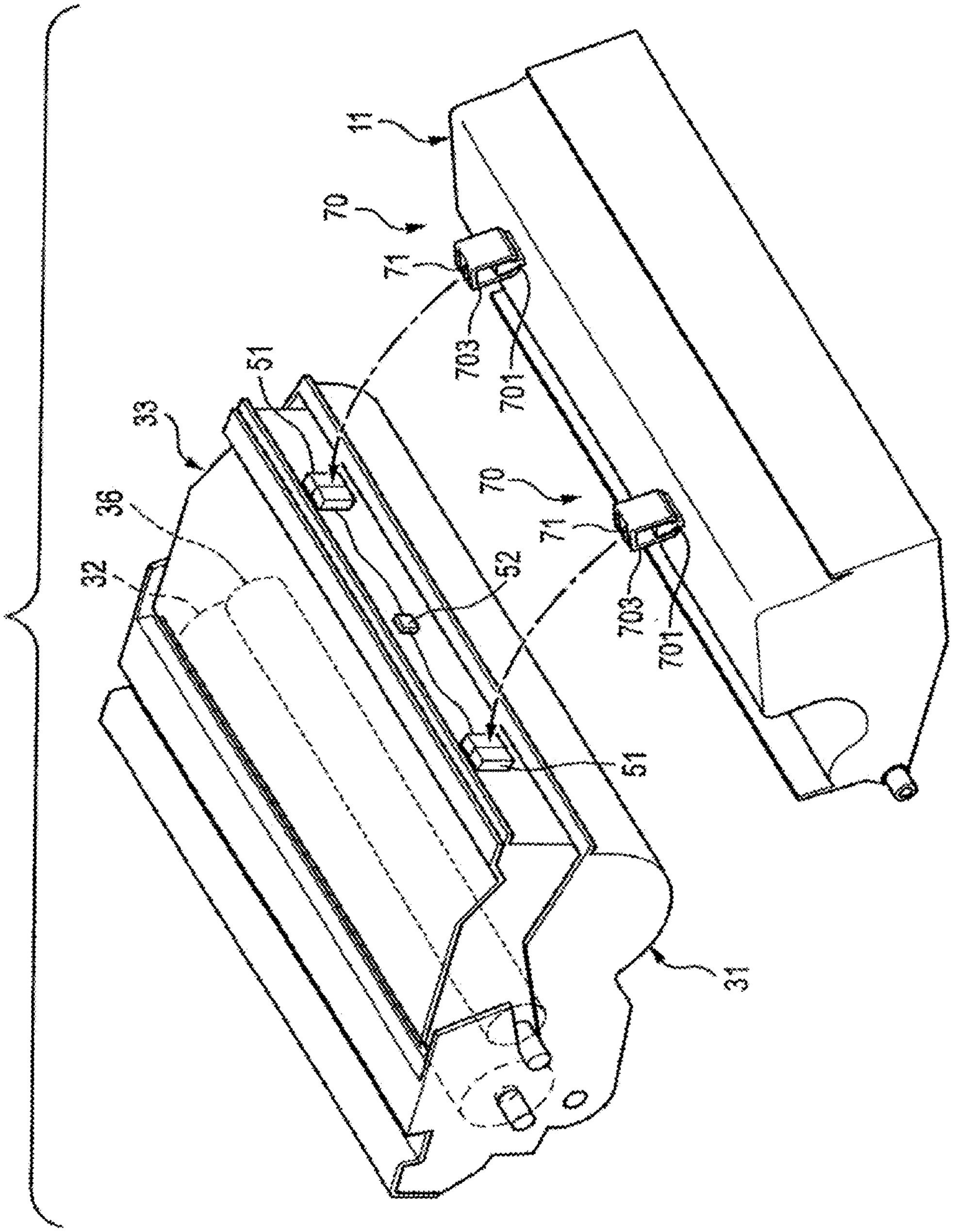
FIG. 6 is a perspective view illustrating a positional relation between the front cover and the process cartridge according to a third embodiment.
Figure 7:
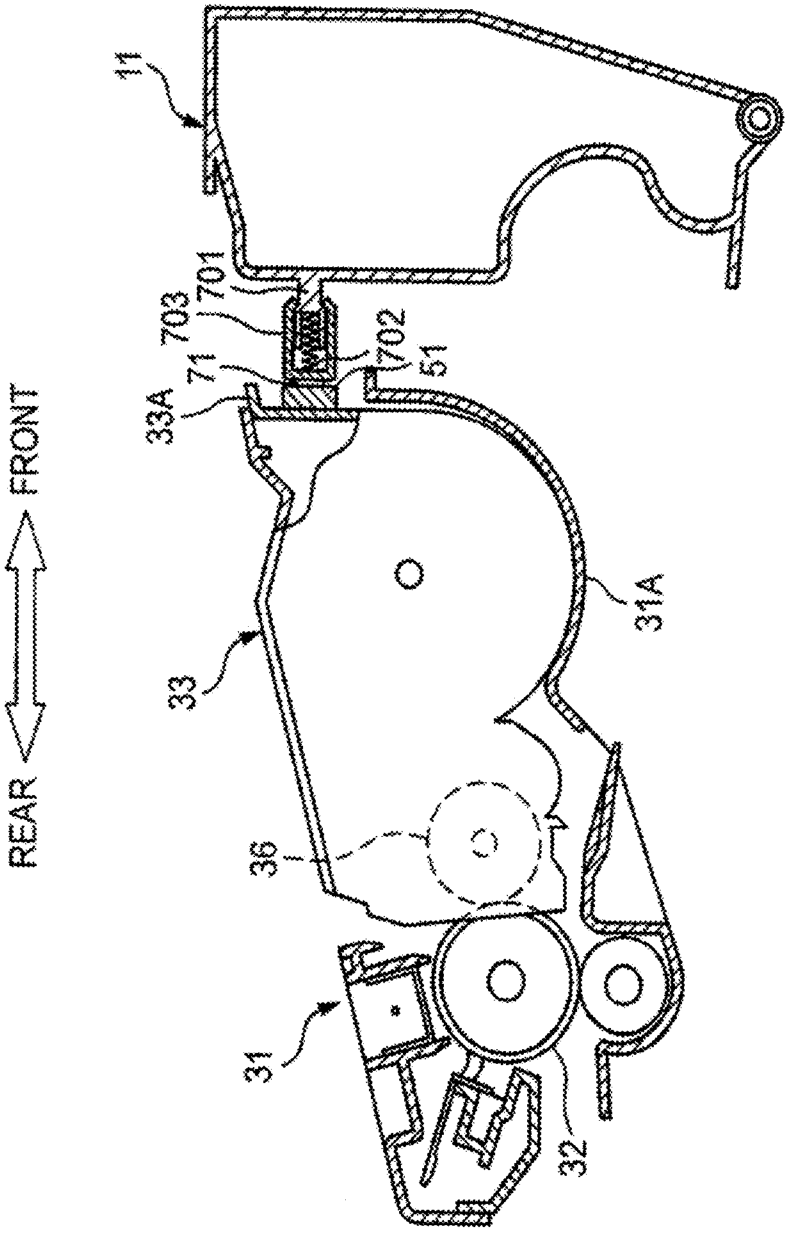
FIG. 7 is a side cross-sectional view illustrating the front portion of the process cartridge and the rear portion of the front cover in a state where the process cartridge is attached to the main casing and the front cover is closed.

FIG. 6 is a perspective view illustrating a positional relation between the front cover 11 and the process cartridge 30. FIG. 7 is a side cross-sectional view illustrating the process cartridge 30 and the front cover 11 in a state where the process cartridge 30 is attached to the main casing 2 and the front cover 11 is closed.

In this embodiment, the photoconductive drum 32 may be disposed in the photoconductor frame 31A or the photoconductor frame 31A may not be provided.

<Pressing Members>

The configuration of the pressing members 70 is the same as the first and second embodiments and thus the arrangement of the pressing members are described.

As shown in FIGS. 6 and 7, the pressing members 70 are disposed on the inner surface of the front cover 11, that is, the surface opposed to the process cartridge 30. The pressing members 70 are disposed at plural positions in the axis direction of the developing roller 36.

As shown in FIG. 6, it is preferable that the pressing members 70 are disposed at plural positions to be symmetric with respect to a plane passing through the center position in the axis direction of the developing roller 36 and perpendicular to the axis direction.

<Main-Body Terminal>

The ends of the spring covers 703 of the pressing members 70 are formed flat, and the main-body terminals 71 are respectively disposed on the flat surfaces to protrude therefrom. The main-body terminals 71 are electrically connected to the controller 6 disposed in the main body.

<Developing-Frame Terminal>

As shown in FIGS. 6 and 7, the developing-frame terminals 51 are disposed at positions, which are exposed from the photoconductor frame 31A when it is attached to the photoconductor frame 31A, on the outer surface of the front portion of the developing frame 33A. As shown in FIGS. 6 and 7, the developing-frame terminals 51 are disposed at positions where they come in contact with the main-body terminals 71 disposed at the spring covers 703 of the pressing members 70, in the state where the front cover 11 is closed.

The developing-frame terminals 51 are electrically connected to the memory unit 52 disposed on the front surface of the developing frame 33A through wires.

Operations of the image forming device 1 having the above-mentioned configuration will be described.

The developer cartridge 33 is attached to the photoconductor frame 31A and the resultant structure is attached to the main body of the image forming device 1. When the front cover 11 is closed, the pressing members 70 come in contact with the developing-frame terminals 51. Then, the springs 702 of the pressing members 70 are pressed and contracted by the developing-frame terminals 51.

As shown in FIG. 7, in the state where the front cover 11 is closed, the expanding pressure of the springs 702 of the pressing members 70 is always applied to the developing-frame terminals 51 and a pressing force toward the photoconductive drum 32 is applied to the developing frame 33A. By means of the pressing force, the developing roller 36 supported by the developing frame 33A is pressed to the photoconductive drum 32 and comes in contact therewith (pressed state). Since the pressing members 70 are disposed at plural positions of the front cover 11 in the axis direction of the developing roller 36 and applies the pressing force thereto, the developing roller 36 is pressed to the photoconductive drum 32 uniformly in the axis direction.

In this pressed state, since the developing-frame terminals 51 come in contact with the main-body terminals 71 disposed on the surfaces of the spring covers 703 of the pressing members 70, the memory unit 52 is connected to the controller 6 disposed in the main body through the developing-frame terminals 51 and the main-body terminals 71.

In the image forming device 1 according to this embodiment, since the main-body terminals 71 are disposed at the pressing members 70, a simple configuration is obtained. Since the main-body terminals 71 disposed at n the pressing members 70 come in contact with the developing-frame terminals 51 and press the developing frame 33A to the photoconductive drum 32, it is possible to match the pressing positions with the electrical connection positions, thereby not affecting the pressing force of the developing roller 36 supported by the developing frame 33A to the photoconductive drum 32.

Although the embodiments of the invention have been described, the invention is not limited to the embodiments, but may be properly modified in various forms. For example, in the above-mentioned embodiments, a leaf spring shape is employed as an example of a terminal, the invention is not limited to it, but a pin shape may be employed.

Further, in the embodiments, the pressing members 70 are disposed at two positions, but three or more pressing members may be provided. In this case, by disposing the pressing members to be as symmetric as possible, it is possible to press the developing roller 36 to the photoconductive drum 32 uniformly in the axis direction.

In the embodiments, the terminals are disposed at all the pressing members 70, but the terminals may not be disposed at all the pressing members 70. For example, one terminal may be disposed as an electrical contact only at one pressing member 70.

In the above-mentioned embodiments, a combination of the compression coil spring and the supporting member is employed as an example of the pressing member, but the invention is not limited to it, and any member may be used so long as it can perform the pressing with high precision. That is, the materials or structures may be properly modified without departing from the technical spirit of the invention.

In the embodiments, the photoconductor cartridge are exemplified as a photoconductor unit detachably attached to the image forming device. However, an unexchangeable photoconductor unit may be provided in the image forming apparatus.

The invention claimed is:

1. A cartridge comprising:

a photoconductive drum rotatable about a first axis extending in a first direction;

a developing roller rotatable about a second axis extending in the first direction;

a memory storing information about the cartridge; and a terminal electrically connected to the memory, wherein the developing roller is positioned between the terminal and the photoconductive drum in a second direction crossing the first direction, and wherein the memory and the terminal are positioned at one end portion of the cartridge in the first direction.

2. The cartridge according to claim 1, wherein a first distance between the developing roller and the terminal in the second direction is larger than a second distance between the developing roller and the photoconductive drum in the second direction.

3. The cartridge according to claim 1, wherein the cartridge is detachably attachable to an image forming apparatus.

4. The cartridge according to claim 3, wherein the terminal is in contact with a main-body terminal of the image forming apparatus in a case where the cartridge is attached to the image forming apparatus.

5. The cartridge according to claim 4, wherein the image forming apparatus includes a cover movable between an open state and a closed state, and wherein the main-body terminal is positioned at the cover of the image forming apparatus.

6. The cartridge according to claim 4, wherein the developing roller is pressed toward the photoconductive drum in a state where the terminal is in contact with the main-body terminal.

7. The cartridge according to claim 1, further comprising:

a supply roller rotatable about a third axis extending in the first direction, wherein the developing roller is positioned between the supply roller and the photoconductive drum in the second direction.

8. The cartridge according to claim 1, further comprising:

a frame, wherein the terminal is positioned at an outer surface of the frame.

9. The cartridge according to claim 8, wherein the terminal is positioned on the outer surface of the frame.

10. The cartridge according to claim 8, wherein the memory is positioned at the outer surface of the frame.

11. The cartridge according to claim 10, wherein the memory is positioned on the outer surface of the frame.

12. The cartridge according to claim 1, further comprising:

a toner hopper configured to accommodate toner, wherein the developing roller is positioned between the toner hopper and the photoconductive drum in the second direction.

* * * * *